United States Patent
Ekanayake et al.

(10) Patent No.: US 9,309,776 B2
(45) Date of Patent: Apr. 12, 2016

(54) REPLACEABLE SEALS FOR TURBINE ENGINE COMPONENTS AND METHODS FOR INSTALLING THE SAME

(75) Inventors: Sanji Ekanayake, Mableton, GA (US); Alston Ilford Scipio, Mableton, GA (US); Raymond Henry Goetze, Simpsonville, SC (US); Peter Samuel King, Greenville, SC (US); Douglas Corbin Warwick, Ball Ground, GA (US)

(73) Assignee: General Electric Company, Schenectady, NY (US)

( * ) Notice: Subject to any disclaimer, the term of this patent is extended or adjusted under 35 U.S.C. 154(b) by 1034 days.

(21) Appl. No.: 13/610,269

(22) Filed: Sep. 11, 2012

(65) Prior Publication Data

US 2014/0079538 A1    Mar. 20, 2014

(51) Int. Cl.
  *F01D 25/24* (2006.01)
  *F01D 11/08* (2006.01)
  *F01D 11/12* (2006.01)
  *B23P 6/00* (2006.01)

(52) U.S. Cl.
  CPC ............... *F01D 11/08* (2013.01); *B23P 6/005* (2013.01); *F01D 11/12* (2013.01); *Y10T 29/49238* (2015.01)

(58) Field of Classification Search
  CPC .................................. F01D 11/08; F01D 11/12
  USPC .................................. 415/173.1–173.3, 173.5
  See application file for complete search history.

(56) References Cited

U.S. PATENT DOCUMENTS

| | | | |
|---|---|---|---|
| 3,843,278 A | 10/1974 | Torell | |
| 3,867,060 A * | 2/1975 | Huber | 415/173.5 |
| 5,547,340 A * | 8/1996 | Dalton et al. | 415/121.2 |
| 5,551,840 A | 9/1996 | Benoit et al. | |
| 5,603,510 A * | 2/1997 | Sanders | 277/413 |
| 6,439,844 B1 * | 8/2002 | Turnquist et al. | 415/173.3 |
| 6,505,834 B1 * | 1/2003 | Dinc et al. | 277/355 |
| 6,896,482 B2 * | 5/2005 | Parry | 415/136 |
| 7,229,246 B2 * | 6/2007 | Ghasripoor | F04D 29/126 |
| | | | 277/413 |
| 8,167,566 B2 | 5/2012 | Howes | |
| 2009/0196742 A1 * | 8/2009 | Turnquist et al. | 415/174.2 |
| 2009/0206554 A1 | 8/2009 | Bowen et al. | |
| 2010/0303612 A1 * | 12/2010 | Bhatnagar | F01D 11/22 |
| | | | 415/127 |

* cited by examiner

*Primary Examiner* — Nathaniel Wiehe
*Assistant Examiner* — Woody A Lee, Jr.
(74) *Attorney, Agent, or Firm* — Armstrong Teasdale LLP

(57) ABSTRACT

An assembly and method are provided for sealing a compressor in a gas turbine engine. The method comprises forming an annular groove in a compressor casing such that the groove extends circumferentially about a rotor that is housed within the casing. The compressor casing is then coupled to the rotor such that the compressor casing extends circumferentially about the rotor. A plurality of arcuate seal segments are then inserted into the annular groove without removing the rotor from the compressor casing such that the plurality of seal segments extend circumferentially about the rotor to facilitate sealing a gap that is defined between the rotor and the compressor casing.

17 Claims, 5 Drawing Sheets

US 9,309,776 B2

REPLACEABLE SEALS FOR TURBINE ENGINE COMPONENTS AND METHODS FOR INSTALLING THE SAME

BACKGROUND OF THE INVENTION

The subject matter disclosed herein relates generally to turbine engine components and, more specifically, to replaceable seals used with turbine engine components.

Known turbine engines operate according to well known principles wherein an incoming stream of atmospheric air flows through the engine along an axially-extending flow path. In at least some turbine engines, at least a portion of the incoming air is compressed in a compressor section of the engine and is then mixed with fuel and ignited in a combustor section to produce a high-energy, high-temperature exhaust gas stream. The hot gas stream exits the combustor and is channeled through a turbine section that extracts energy from the exhaust stream to power the compressor and to provide useful work, such as powering an aircraft in flight or producing electricity.

In the compressor and turbine sections of known gas turbine engines, blades rotate about the center axis of the engine. At least some known blade tips rotate in close proximity to a surrounding engine casing and may rub an inner surface of the casing. Engine efficiency depends at least partially on minimizing leakage in an effort to maximize interaction between the gas stream and blades. Within known turbines, one source of inefficiency is leakage of gas past the tips of the blades and between the blade tips and the surrounding engine casing. Although a close tolerance fit may be obtained by fabricating the mating parts to a close tolerance range, such a fabrication process is costly and time-consuming As such, to increase engine efficiency, at least some turbines use a sealing element along the inner surface of the casing, to reduce leakage between the blade tips and the casing. Various sealing techniques have been used. Generally, known sealing elements lose effectiveness over time and may require replacement. However, in order to replace known sealing elements, the engine casing and the rotor must be removed from the engine to provide workers access to the sealing elements. Such a process significantly increases the maintenance costs and may cause a prolonged duration in engine outages.

BRIEF DESCRIPTION OF THE INVENTION

In one aspect, a seal assembly for use in a turbine engine that includes a compressor casing that at least partially circumscribes a rotor is provided. The seal assembly comprises a plurality of arcuate seal segments that are configured to be at least partially inserted into a groove defined in the compressor casing to substantially seal a gap that is defined between the casing and the rotor. Each of the plurality of seal segments comprises a radially inner projection, a radially outer projection, and a neck portion extending therebetween.

In another aspect, a method of sealing a compressor in a turbine engine is provided. The method comprises forming an annular groove in a compressor casing such that the groove extends circumferentially about a rotor that is housed within the casing. The compressor casing is then coupled to the rotor such that the compressor casing extends circumferentially about the rotor. A plurality of arcuate seal segments are then inserted into the annular groove without removing the rotor from the compressor casing such that the plurality of seal segments extend circumferentially about the rotor to facilitate sealing a gap that is defined between the rotor and the compressor casing.

In yet another aspect, a turbine engine system is provided. The turbine engine system comprises a rotor, a compressor that includes a plurality of stages sequentially spaced on the rotor along a longitudinal axis, a compressor casing that at least partially circumscribes the rotor, and a plurality of arcuate seal segments for each of the plurality of stages. Each of the plurality of arcuate seal segments is configured to slideably couple to the compressor casing without removing the rotor from the compressor casing to substantially seal a gap that is defined between the casing and the rotor at each stage.

DETAILED DESCRIPTION OF THE INVENTION

Figure 1:
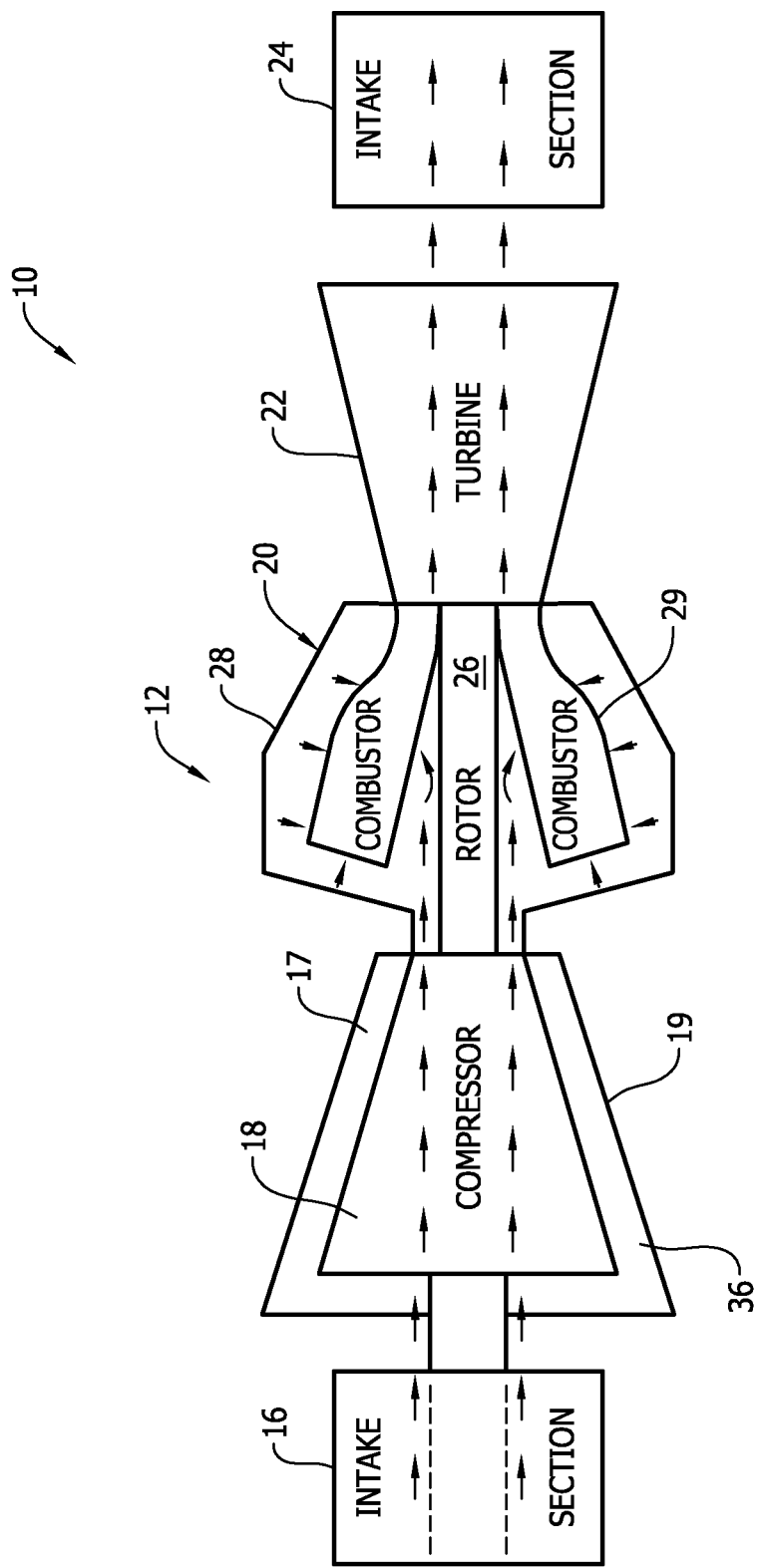
FIG. 1 is a schematic illustration of an exemplary turbine engine.

FIG. 1 illustrates an exemplary turbine system 10 including a gas turbine engine 12. In the exemplary embodiment, turbine engine 12 includes an air intake section 16, a compressor 18, a combustor section 20, a turbine 22, and an exhaust section 24. Compressor 18, combustor section 20, and turbine 22 are all coupled to a central rotor shaft 26. Turbine engine 12 also includes a casing 36 that circumscribes compressor 18 and rotor 26. Casing 36 is divided axially into an upper half section 17 and a lower half section 19.

As indicated by arrows, air enters gas turbine engine 12 through intake section 16 and flows into compressor 18. Compressor 18 includes multiple stages 31 of rotor blades (not shown in FIG. 1) to compress the air prior to the air being channeled into combustor section 20. Combustor section 20 includes a set of combustors 29 between compressor 18 and turbine 22. Compressed air from compressor 18 enters combustors 29 and is mixed with fuel prior to being ignited to create an exhaust flow that drives turbine 22. More specifically, the hot combustion gases flow through turbine 22, which drives rotor 26 and powers compressor 18 and/or an electric generator (not shown). The hot combustion gases are discharged from turbine engine 12 through exhaust section 24.

Figure 2:
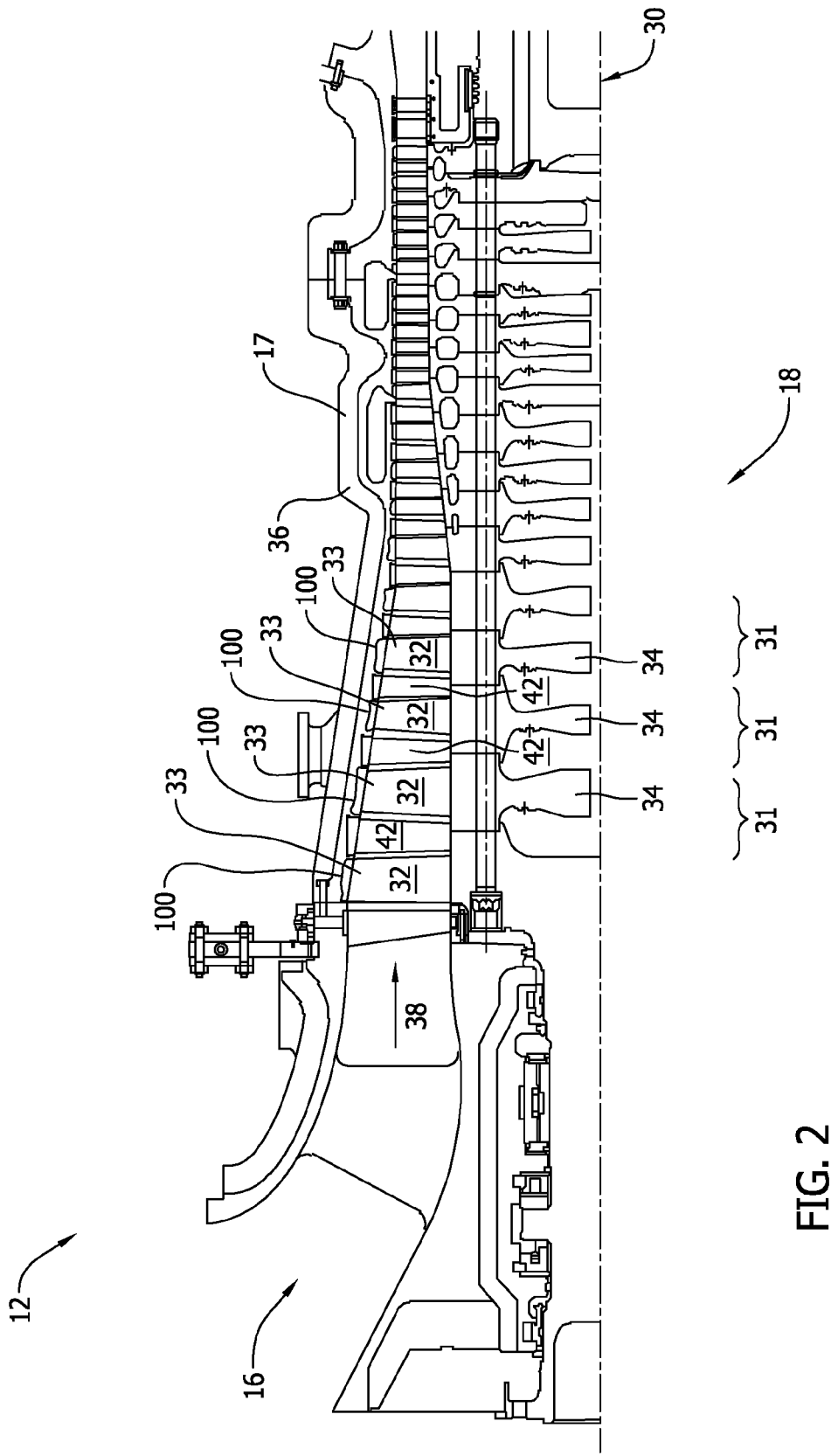
FIG. 2 is a cross-sectional view of the turbine engine shown in FIG. 1 and taken along a longitudinal axis of the turbine engine.

FIG. 2 is a cross-sectional view of turbine engine 12 taken through a longitudinal axis 30 extending through engine 12. In the exemplary embodiment, engine 12 also includes a plurality of circumferentially-spaced rotor blades 32 that extend radially outward towards casing 36 from a rotor wheel 34 coupled to rotor shaft 26 (shown in FIG. 1). Stator vanes 42 are positioned adjacent to each set of rotor blades 32, and in combination form a stage 31. Stator vanes 42 are securely coupled to compressor casing 36 and extend radially inward to interface with rotor wheel 34. Each stage 31 directs a flow of compressed air through compressor 18. Compressor 18 further defines an annular flow area 58 (not shown in FIG. 2) that extends between casing 36 and rotor wheel 34. Rotor blades 32 are circumscribed by compressor casing 36, such that an annular gap (not shown in FIG. 2) is defined between casing 36 and a tip 33 of each rotor blade 32.

Each gap is sized to facilitate minimizing a quantity of compressed air that bypasses rotor blades 32. Specifically, in the exemplary embodiment, a seal assembly 100 is used between compressor casing 36 and rotor 26 to substantially seal the gap defined therebetween. Specifically, seal assembly 100 facilitates reducing bypass flow of compressed air between compressor casing 36 and rotor blade tips 33. As described in more detail below, seal assembly 100 includes a plurality of replaceable arcuate seal segments 40 (not shown in FIG. 2), at least one biasing mechanism (not shown in FIG. 2), and an anti-rotation device (not shown in FIG. 2). In the exemplary embodiment, compressor 18 includes eighteen separate stages 31. Alternatively, seal assembly 100 as described herein may be employed in any suitable type of compressor with any number of stages. For example, seal segment 40 may be included in a single stage gas compressor, or in a steam turbine.

During operation, air flows into engine 12 through intake 16 and towards compressor 18. Stator vanes 42 direct the compressed air towards rotor blades 32. The compressed air applies motive forces to rotor blades 32 to compress the air flowing through each stage 31.

Figure 3:
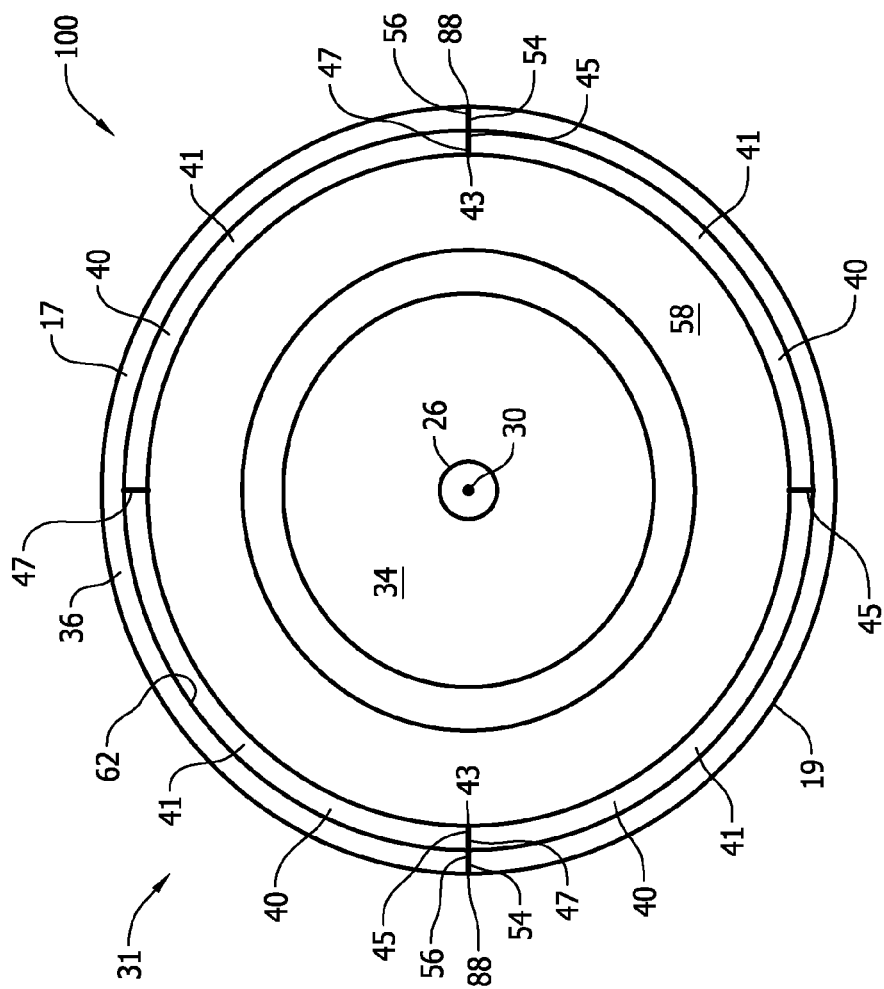
FIG. 3 is an axial view of one compressor stage and illustrates an exemplary seal assembly.

FIG. 3 is an axial view along longitudinal axis 30 of one compressor stage 31 with an exemplary seal assembly 100. In the exemplary embodiment, casing 36 is assembled by removably coupling upper half section 17 to lower half 19 section such that end faces 54 of upper half 17 are coupled against end faces 56 of lower half 19 along seams 88. A plurality of replaceable sealing segments 40 are removably coupled to a radially inner surface 62 of casing 36 such that each stage 31 includes a seal assembly 100 extending between casing 36 and a flow area 58 of rotor blades 32, as is described in more detail below.

In the exemplary embodiment, each seal assembly 100 includes one seal segment 40, but may include any number of seal segments 40 that enables seal assembly 100 to function as described herein. In the exemplary embodiment, each seal segment 40 includes a first end face 45, an opposing end face 47, and a body 41 extending therebetween. As such, when adjacent seal segments 40 are coupled together, an end face 47 of a first seal segment 40 is coupled to and end face 45 of a second adjacent seal segment 40 to form a seam 43 therebetween. Accordingly, each seal assembly 100 includes at least two seams 43 that are substantially flush with seams 88. As such, upon removal of casing upper half 17, access is provided to the end face 47 of one sealing segment 40 within either casing upper half 17 or within casing lower half 19, and to the end face 45 of an adjacent seal segment 40 in the opposite half of casing 36. Seal segments 40 are removably and slideably coupled to casing 36 to substantially seal a gap (not shown in FIG. 3) defined between the casing and the rotor. Specifically, seal segments 40 are coupled to casing 36 such that when a sealing segment 40 is inserted into casing 36, an end face 45 or 47 of each segment 40 is substantially flush with an end face 54 or 56 of upper half 17 or lower half 19, respectively, and also seams 88.

Figure 4:
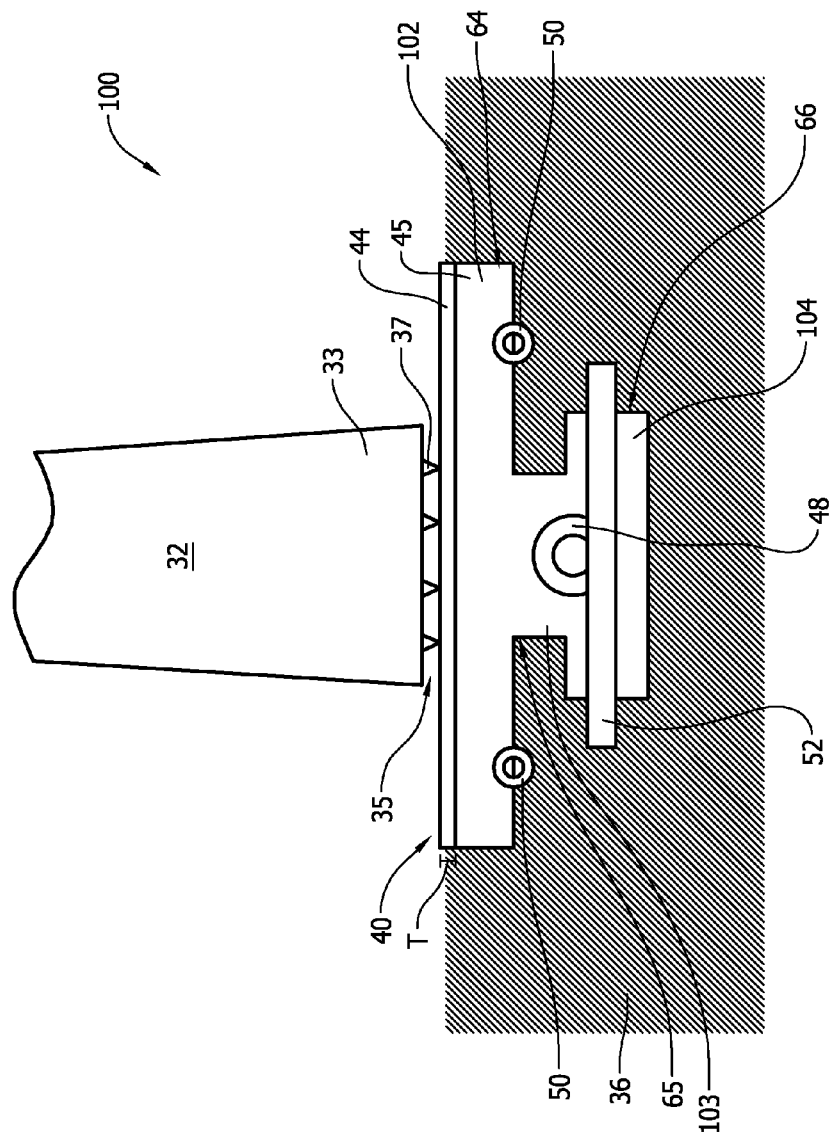
FIG. 4 is a cross-sectional view of an exemplary seal assembly that may be used with the seal assembly shown in FIG. 3.
Figure 5:
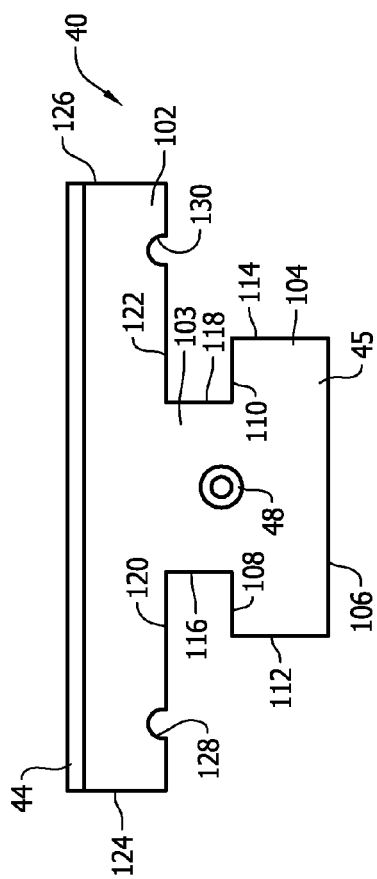
FIG. 5 is a cross-sectional view of an exemplary replaceable seal segment that may be used in the seal assembly shown in FIG. 3.
Figure 6:
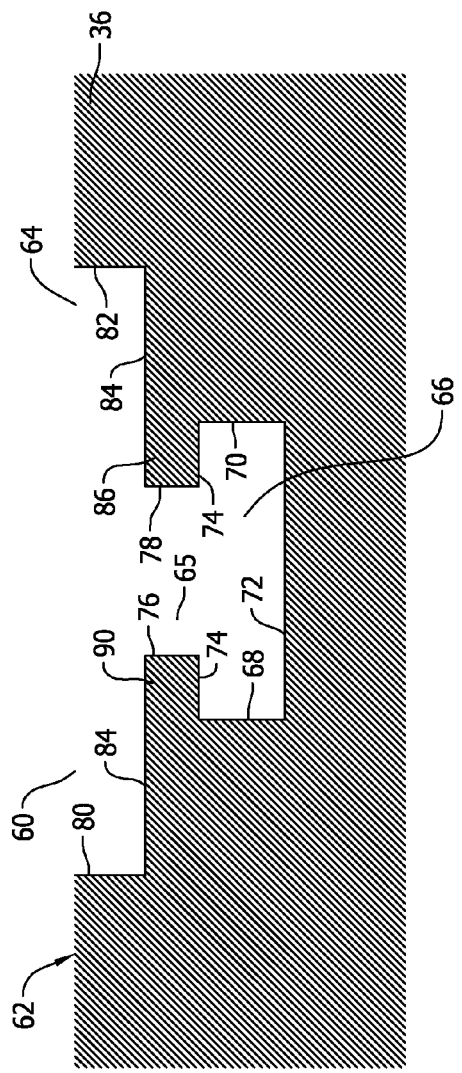
FIG. 6 is a cross-sectional view of an exemplary compressor casing that may be used with the seal assembly shown in FIG. 3.

FIG. 4 is a cross sectional view of an exemplary seal assembly 100 that may be used with gas turbine engine 12 (shown in FIG. 1). FIG. 5 is a cross-sectional view of a replaceable seal segment 40 that may be used with seal assembly 100. FIG. 6 is a cross-sectional view of compressor casing 36. Seal assembly 100 includes a plurality of arcuate sealing segments 40 seated within a retaining groove 60 machined into compressor casing 36 and may also include an anti-rotation device 52 and at least one biasing (spring loading) mechanism 50.

In the exemplary embodiment, compressor casing 36 includes a radially inner surface 62 and annular segment retaining groove 60 that is defined about the periphery of casing 36. More specifically, retaining groove 60 is defined in radially inner surface 62 and is sized and oriented to receive replaceable sealing segments 40 therein. Retaining groove 60 includes a radially inner groove 64, a radially outer groove 66, and an intermediate groove 65. Intermediate groove 65 extends between inner groove 64 and outer groove 66.

Outer groove 66 includes a base surface 72 and a retaining surface 74 that is defined by opposing parallel side walls 68 and 70 such that retaining surface 74 is radially inward from base surface 72. Intermediate groove 65 extends radially inward from retaining surface 74 and includes opposing parallel side walls 76 and 78. Inner groove 64 extends between inner surface 62 and intermediate groove 65, and includes opposing parallel side walls 80 and 82, and a base surface 84. Side walls 76 and 78 extend between base surface 84 and retaining surface 74. Retaining groove 60 also includes hook portions 86 and 90. Hook portion 86 is defined by base surface 84, side wall 76, and retaining surface 74, and hook portion 90 is defined by base surface 84, side wall 78, and retaining surface 74.

In the exemplary embodiment, seal assembly 100 also includes a plurality of replaceable seal segments 40. Each seal segment 40 includes a first end face 45, a second end face 47 (shown in FIG. 3), and a body 41 (shown in FIG. 3) extending therebetween. Each segment 40 also includes a radially inner projection 102, a radially outer projection 104, and a neck portion 103 extending therebetween. Each inner projection 102, outer projection 104, and neck portion 103 extend along body 41 between end faces 45 and 47.

Outer projection 104 includes a base surface 106, a first inner surface 108, and a second inner surface 110. Surfaces 108 and 106 are spaced apart by a side wall 112. Similarly, surfaces 110 and 106 are spaced apart by a side wall 114. Neck portion 103 extends from first and second inner surfaces 108 and 110 and includes opposing side walls 116 and 118. Inner projection 102 is defined by a first outer surface 120, a second outer surface 122, and a sealing surface 44. A side wall 124 extends between surfaces 44 and 120. Similarly, a side wall 126 also extends between surfaces 44 and 122. Side wall 116 extends between outer surface 120 and inner surface 108, and side wall 118 extends between surfaces 122 and 110.

In the exemplary embodiment, replaceable arcuate seal segment 40 also includes a first cutout 128 defined along first outer surface 120 and a second cutout 130 defined along second outer surface 122. Cutouts 128 and 130 are sized to receive at least a portion of biasing mechanism 50 therein. In the exemplary embodiment, cutouts 128 and 130 are semicircular in shape, but, alternatively, may be rectangular or any other shape that allows seal assembly to function as described herein. Seal segment 40 may also include a tool acceptor 48. In the exemplary embodiment, tool acceptor 48 is an opening machined into both end faces 45 and 47 and that is sized to receive a tool therein to facilitate removal of arcuate seal segment 40 from casing 36, as is described in more detail below.

Seal surface 44, and therefore, seal assembly 100, facilitates substantially sealing the annular gap 35 defined between blade tip 33 of rotor 26 and seal assembly 100. Seal surface 44 may include an abradable sealing surface, a honeycomb sealing surface, a brush sealing surface, and/or any sealing surface that enables seal assembly 100 to function as described herein. Seal surface 44 may be thermally sprayed, brushed, and/or baked, and may be fabricated from a metallic material, a ceramic material, or any other material that enables seal surface 44 to function as described herein. Seal surface 44 may include a plurality of bristles formed from a metallic or non-metallic material, such as ceramics, carbon fiber, and/or silica. Moreover, seal surface 44 may be used in combination with at least one cutter tooth 37 that substantially prevents air from flowing between seal surface 44 and rotor tip 33. Cutter teeth 37 may extend from blade tip 33 and are configured to cut grooves to facilitate reducing leakage around blade tip 33. Seal surface 44 has a thickness T which varies according to each stage 31.

In the exemplary embodiment, seal surface 44 may be fabricated from a variety of materials depending in which stage 31 (shown in FIG. 2) seal assembly 100 is used. For example, materials having enhanced wear characteristics and greater restorative capability, such as a brush seal surface, may be used in the more aft stages 31 of compressor 18 because the aft stages 31 are more susceptible to greater radial translation due to a greater distance from the shaft bearing assembly (not shown) than forward stages 31. However, materials with less restorative capabilities, such as abradable and honeycomb seal surfaces, may be used in forward stages 31 of compressor 18 where there is less radial translation of rotor 26 (shown in FIG. 1).

In the exemplary embodiment, seal segments 40 are slideably coupled to casing 36 to substantially seal gap 35 defined between casing 36 and rotor 26. Specifically, each replaceable seal segment 40 is removably coupled to casing 36 such that each segment 40 extends generally radially between blade tip 33 and casing 36 to form seal assembly 100. Each replaceable seal segment 40 slideably engages retaining groove 60 without requiring removal of rotor 26 (shown in FIG. 2) from engine 12 (shown in FIG. 1). Specifically, as seal segments 40 are inserted into casing 36, lower portion 19 (shown in FIG. 2) of casing 36 at least partially circumscribes rotor 26. After seal segment 40 has been inserted into retaining groove 60, radially inner groove 64 is oriented to receive radially inner projection 102 therein such that side wall 124 is against side wall 80 and such that side wall 126 is against side wall 82. Moreover, intermediate groove 65 receives neck portion 103 such that side wall 116 is against side wall 76 and such that side wall 118 is against side wall 78. Furthermore, radially outer groove 66 receives radially outer projection 104 such that side wall 112 is against side wall 68 and such that side wall 114 is against side wall 70. Seal surface 44 is oriented such that it extends a distance above and below casing inner surface 62 to facilitate sealing annular gap 35.

First and second semicircular cutouts 128 and 130 are sized to receive at least a portion of biasing mechanisms 50 therein. In the exemplary embodiment, biasing mechanism 50 is a coil spring. Alternatively, biasing mechanism 50 may be any other biasing mechanism, such as a wave spring, that biases seal segment 40 against casing 36. Biasing mechanisms 50 facilitate reducing the clearance defined between first and second outer surfaces 120 and 122 of inner projection 102 and base surface 84 of inner groove 64. Moreover, biasing mechanisms 50 enable extraction of replaceable seal segment 40 from retaining groove 60 as described herein. Specifically, the inward force applied by biasing mechanism 50 enables seal segment 40 to be retained with a hook-to-hook fit as hook portion 86 engages second inner surface 110 and as hook portion 90 engages first inner surface 108. The hook-to-hook fit facilitates securing seal segment 44 in place and ensures a seal is created that substantially prevents bypass air leakage into retaining groove 60.

In the exemplary embodiment, anti-rotation device 52 facilitates preventing seal segments 40 from rotating within retaining groove 60. Anti-rotation device 52 is positioned between two adjacent sealing segments 40. More specifically, in the exemplary embodiment, device 52 is positioned between two adjacent sealing segments 40 that are within casing upper half 17. Moreover, device 52 is coupled to casing 36 such that when upper half 17 is coupled against lower half 19, upper half 17 securely retains device 52 in place to facilitate preventing seal segments 40 from rotating. During engine 12 start-up, blade tip 33 may contact sealing surface 44 and urge seal segments 40 to slide circumferentially within retaining groove 60. However, device 52 substantially prevents segments 40 from rotating such that seams 43 and 88 remain substantially flush, thus maintaining the ability to easily extract the seal segment during routine maintenance.

In the exemplary embodiment, seal assembly 100 may be installed in newly-fabricated turbine engines 12. Alternatively, seal assembly 100 may be installed as a retro-fit upgrade for turbine engines 12 that do not include seal assemblies or that include inferior seal assemblies. To retro-fit operational gas turbine engines, retaining groove 60 is machined into casing 36 during a regular major inspection or maintenance procedure. Removably coupling each seal segment 40 to casing 36 eliminates a need to remove rotor shaft 26 and rotor wheels 34 from engine 12 to replace sealing segment 40, and as such, reduces an amount of time engine 12 is offline and thus decreases maintenance costs.

During operation, air is channeled through compressor 18, and more specifically, is directed in the direction of arrow 38. Moreover, air is channeled towards rotor blades 32 of each stage 31 through stator vanes 42. Seal assembly 100 facilitates reducing an amount of air that may flow undesirably past rotor blades 32 and through gap 35. More specifically, seal assembly 100 facilitates mitigating reverse air flow leakage losses by substantially sealing gap 35. As a result, the amount of air that may flow through rotor blades 32 is increased, thus facilitating increasing efficiency of compressor 18 and turbine engine 12.

In the exemplary embodiment, a method of sealing a compressor, such as compressor 18 in a turbine engine, such as engine 12, using a seal assembly, such as seal assembly 100, is provided. Generally, the method comprises forming an annular segment retaining groove, such as retaining groove 60, in a compressor casing, such as casing 36, such that the groove extends circumferentially about a rotor, such as rotor 26, which is housed within the casing. A plurality of arcuate seal segments, such as seal segments 40, are then inserted into the annular groove such that the plurality of seal segments extend circumferentially about the rotor to facilitate sealing a gap, such as gap 35, defined between the rotor and the compressor casing. Specifically, the compressor casing includes a removable upper half portion, such as upper half 17, and a removable lower half portion, such as lower half 19. The annular segment retaining groove defines a radially inner groove portion, such as inner groove portion 64, and a radially outer groove portion, such as outer groove portion 66, spaced by an intermediate groove portion, such as intermediate groove portion 65. At least one of the upper half and lower half of the casing is removed to provide access to the annular segment retaining groove. Each of the seal segments includes a radially inner projection, such as inner projection 102, a radially outer projection, such as outer projection 104, and a neck portion, such as neck portion 103, therebetween.

An anti-rotation device, such as device 52, is coupled to the upper half portion of the compressor casing to prevent the seal segments from shifting circumferentially within the casing. Two arcuate sealing segments, with biasing mechanisms, such as biasing mechanisms 50, are inserted into the annular segment retaining groove of each of the upper and lower half portions of the compressor casing such that the radially inner projection of each sealing segment abuts the radially inner groove portion of the compressor casing and the radially outer projection of each sealing segment is held within the radially outer groove portion of the compressor casing. During installation of the arcuate seal segments into the casing, the lower portion of the casing is coupled to and extends circumferentially about the rotor such that removal of the rotor is not required for assembly of the seal assembly. After installation of the arcuate sealing segments, the upper and lower half portions of the casing are coupled together such that the compressor casing and the seal segments form a seal assembly for a stage, such as stage 31, of a turbine engine.

Furthermore, the method enables the sealing segments to be replaceable without requiring removal of the rotor from the engine. To replace the sealing segments for a stage in the gas turbine engine, the upper half of the compressor casing is removed to provide access to the sealing segments in the annular retaining groove in both halves of the casing. The anti-rotation device is also removed, allowing the sealing segments to shift within the retaining groove. Each sealing segment includes a tool acceptor, such as tool acceptor 48, which is sized to receive a tool to facilitate removal of the sealing segment from the casing. A tool is inserted into the tool acceptor such that when a pulling force is exerted on the tool, the sealing segment slides out of the retaining groove and is removed from the casing as the lower portion of the compressor casing at least partially circumscribes the rotor. The biasing mechanisms also facilitate removal of the arcuate seal segments by deforming under the load applied by the tool, therefore allowing clean extraction of the seal segment. After removal of the seal segments from the upper and lower half portions of the casing, the anti-rotation device is recoupled to the casing and replacement seal segments are inserted into the retaining groove. The upper half portion of the casing is then recoupled to the lower half portion of the casing.

The above-described systems and method facilitate reducing an amount of compressed air that may flow past rotor blades through a gap defined between the blades and the compressor casing. More specifically, the above-described systems and method facilitate mitigating air flow losses by substantially sealing the clearance gap without requiring removal of the engine rotor. As a result, an amount of air that may flow through the rotor blades is increased, which in turn increases the efficiency of the gas turbine. Accordingly, by leaving the rotor in place, costs and/or time associated with maintaining and/or repairing the compressor are facilitated to be reduced.

Exemplary embodiments of a seal assembly are described in detail above. The seal assembly is not limited to use with the compressor described herein, but rather, the seal assembly can be utilized independently and separately from other gas turbine engine components described herein. Moreover, the disclosure is not limited to the embodiments of the seal assembly described above in detail. Rather, other variations of the seal assembly may be utilized within the spirit and scope of the claims.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A seal assembly for use in a turbine engine including a compressor casing that at least partially circumscribes a rotor, said seal assembly comprising a plurality of arcuate seal segments configured to be at least partially inserted into a groove defined in the compressor casing to substantially seal a gap defined between the casing and the rotor, wherein each of said plurality of seal segments comprises a radially inner projection, a radially outer projection, and a neck portion extending therebetween and wherein said groove is configured to receive an entirety of said radially inner projection, said radially outer projection and said neck portion wherein each of said plurality of seal segments further comprises a tool acceptor configured to facilitate removal of said seal segment from the compressor casing, wherein said tool acceptor comprises a circumferentially-oriented opening defined in an end surface of each of said plurality of seal segments.

2. An assembly in accordance with claim 1, wherein said groove includes at least one hook portion configured to retain each of said plurality of arcuate seal segments within said groove.

3. An assembly in accordance with claim 1, wherein said seal assembly further comprises an anti-rotation device coupled to the compressor casing, said anti-rotation device configured to prevent said plurality of arcuate seal segments from shifting circumferentially within said groove.

4. An assembly in accordance with claim 1, wherein each of said plurality of seal segments further comprises at least one cutout sized to receive at least a portion of a biasing mechanism therein.

5. An assembly in accordance with claim 4, wherein said biasing mechanism comprises one of a coil spring and a wave spring.

6. An assembly in accordance with claim 1, wherein said each of said plurality of seal segments further comprises a sealing surface extending a full circumferential length and a full axial length along each said seal segment, said sealing surface extends a distance above and below a radially inner surface of the compressor casing when said seal segment is coupled the compressor casing.

7. An assembly in accordance with claim 6, wherein said sealing surface comprises one of an abradable seal surface, a honeycomb seal surface, and a brush seal surface.

8. A method of sealing a compressor in a turbine engine, said method comprising:

forming an annular groove in a compressor casing such that the groove extends circumferentially about a rotor housed within the casing;

coupling the compressor casing to the rotor such that the compressor casing extends circumferentially about the rotor;

inserting a plurality of arcuate seal segments into the annular groove without removing the rotor from the compressor casing such that the plurality of seal segments extend circumferentially about the rotor to facilitate sealing a gap defined between the rotor and the compressor casing, wherein each of said plurality of seal segments comprises a radially inner projection, a radially outer projection, and a neck portion extending therebetween, and wherein inserting comprises inserting an entirety of said radially inner projection, said radially outer projection, and said neck portion into the groove; and inserting a tool into a tool acceptor of each of the first plurality of arcuate seal segments such that when a pulling force is exerted on the tool, each arcuate seal segment is removed from the compressor casing as the lower portion of the compressor casing at least partially circumscribes the rotor, wherein the tool acceptor includes a circumferentially-oriented opening defined in an end surface of each of the plurality of seal segments.

9. A method in accordance with claim 8, wherein said each of said plurality of seal segments further comprises a sealing surface extending a full circumferential length and a full axial length along each said seal segment, said sealing surface extends a distance above and below a radially inner surface of the compressor casing when said seal segment is coupled to the compressor casing.

10. A method in accordance with claim 9, wherein said sealing surface comprises one of an abradable seal surface, a honeycomb seal surface, and a brush seal surface.

11. A method in accordance with claim 8 further comprising coupling an anti-rotation device to the compressor casing to prevent said plurality of arcuate seal segments from shifting circumferentially within compressor casing groove.

12. A method in accordance with claim 8 further comprising replacing the plurality of arcuate seal segments for each stage of the compressor, the method comprising:

removing an upper portion of the compressor casing to provide access to a first plurality of seal segments within the upper portion and a lower portion of the compressor casing;

removing an anti-rotation device to allow each of the first plurality of arcuate seal segments to shift within the compressor casing;

inserting a tool into a tool acceptor of each of the first plurality of arcuate seal segments such that when a pulling force is exerted on the tool, each arcuate seal segment is removed from the compressor casing as the lower portion of the compressor casing at least partially circumscribes the rotor;

inserting a second plurality of arcuate seal segments into the upper portion and the lower portion of the compressor casing;

recoupling the anti-rotation device to the compressor casing; and recoupling the upper portion of compressor casing to the lower portion of compressor casing.

13. A turbine engine system comprising:

a rotor;

a compressor including a plurality of stages sequentially spaced on the rotor along a longitudinal axis;

a compressor casing that at least partially circumscribes the rotor;

a plurality of arcuate seal segments for each of the plurality of stages, wherein each of said plurality of arcuate seal segments is configured to slidably couple to the compressor casing without removing the rotor from the compressor casing to substantially seal a gap defined between the casing and the rotor at each stage, wherein each of said plurality of seal segments further comprises a tool acceptor configured to facilitate removal of said seal segment from said compressor casing, wherein said tool acceptor comprises a circumferentially-oriented opening defined in an end surface of each of said plurality of seal segments.

14. A turbine engine system in accordance with claim 13, wherein said compressor casing comprises a groove defined therein and each of said plurality of seal segments comprises a radially inner projection, a radially outer projection, and a neck portion extending therebetween, wherein said groove is configured to receive an entirety of said radially inner projection, said radially outer projection, and said neck portion.

15. A turbine engine in accordance with claim 13, wherein said each of said plurality of seal segments further comprises a sealing surface extending a full circumferential length and a full axial length along each said seal segment, said sealing surface extends a distance above and below a radially inner surface of the compressor casing when said seal segment is coupled the compressor casing.

16. A turbine engine system in accordance with claim 15, wherein said sealing surface comprises one of an abradable seal surface, a honeycomb seal surface, and a brush seal surface.

17. A turbine engine system in accordance with claim 15, wherein a sealing surface having greater restorative capabilities is utilized in the aft stages of the engine and a sealing surface having reduced restorative capabilities is utilized in the forward stages of the engine.

* * * * *